US006823225B1

(12) United States Patent
Sass

(10) Patent No.: US 6,823,225 B1
(45) **Date of Patent: *Nov. 23, 2004**

(54) APPARATUS FOR DISTRIBUTING AND PLAYING AUDIO INFORMATION

(75) Inventor: Jonathan Sass, Truckee, CA (US)

(73) Assignee: IM Networks, Inc., San Jose (*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 181 days.

(21) Appl. No.: 08/984,772

(22) Filed: Dec. 4, 1997

Related U.S. Application Data

(60) Provisional application No. 60/040,289, filed on Feb. 12, 1997.

(51) Int. Cl.[7] .............................................. G06F 17/00
(52) U.S. Cl. .......................... 700/94; 709/217; 709/219
(58) Field of Search ........................ 364/400.01; 369/1; 395/200.3, 200.33, 200.47, 200.48, 200.49; 709/217, 219; 700/94

(56) References Cited

U.S. PATENT DOCUMENTS 5,142,528 A * 8/1992 Kobayashi et al. ........... 370/79
5,557,541 A * 9/1996 Schulhof et al. ....... 364/400.01
5,572,442 A * 11/1996 Schulhof et al. ............ 709/219
5,629,867 A * 5/1997 Goldman ..................... 381/77
5,726,909 A * 3/1998 Krikorian .................... 700/94
5,790,423 A * 8/1998 Lau et al. .............. 364/400.01
5,793,980 A * 8/1998 Glaser et al. ............... 709/231
5,809,246 A * 9/1998 Goldman ............... 395/200.47
5,828,839 A 10/1998 Moncreiff ............. 395/200.34
5,841,979 A * 11/1998 Schulhof et al. ....... 395/200.67
5,892,536 A * 4/1999 Logan et al. ................. 348/13
5,922,045 A * 7/1999 Hanson ...................... 709/206
5,926,624 A * 7/1999 Katz et al. ............. 395/200.47
5,956,681 A 9/1999 Yamakita .................... 704/260
6,012,086 A 1/2000 Lowell ........................ 709/218
6,014,569 A 1/2000 Bottom ...................... 455/466
6,047,327 A * 4/2000 Tso et al.
6,279,029 B1 * 8/2001 Sampat et al.

OTHER PUBLICATIONS

AUDIOACTIVE, "Product Brochure for Adioactive."
CD RADIO, "Internet Website for CD Radio."

* cited by examiner

*Primary Examiner*—Xu Mei
*Assistant Examiner*—Brian Pendleton
(74) *Attorney, Agent, or Firm*—K. David Crockett, Esq.; Crockett & Crockett

(57) ABSTRACT

A system and method for distributing audio information is disclosed. The system comprises a receiver, a server, and a communication network. The receiver allows a user to select and receive audio information that is stored at a location remote to the user. The server stores data and network addresses of programs that are available to the user. The communication network facilitates communication between the receiver, the server, and other devices attached to the network. The server or a network source may transmit audio data to the receiver that contemporaneously receives and plays the data for the user.

4 Claims, 4 Drawing Sheets

APPARATUS FOR DISTRIBUTING AND PLAYING AUDIO INFORMATION

CROSS REFERENCES TO RELATED APPLICATIONS

This application claims priority of provisional patent application No. 60/040,289 filed on Feb. 12, 1997.

BACKGROUND OF THE INVENTION

1. Field of Invention

The present invention relates to a system for distributing audio information. More particularly, the present invention allows a user to select and retrieve audio information from a server or source on a communication network, the audio information being transmitted to a receiver in a stream of data and the receiver being able to play the data as it is received.

2. Description of Related Art

Various systems had been developed for distributing audio information to users. For example, the systems disclosed in U.S. Pat. Nos. 5,557,541 and 5,572,442, both issued to Schulhoff et al., use a storage/playback device to store and play audio information. The storage/playback device is inserted into a docking station that is interfaced with a communication network. The audio information is then transferred to the storage/playback device via the docking station.

One of the disadvantages of this system is that it requires the user to preselect the programs the user wishes to listen to or use. It does not allow the user to contemporaneously select and play a program. The user must plan ahead and store the programs that the user wishes to listen to at a later time. Furthermore, this system is not capable of playing live broadcasts. The program must be prerecorded so that it can be transferred to the storage/playback device. Most users would find these to be undesirable constraints. The portable storage/playback device also cannot receive audio information independently. It must be interfaced with a docking device in order to receive the information.

What is needed, is an audio system that allows a user to contemporaneously select, receive, and play live and prerecorded audio programs. This provides users with a much greater degree of flexibility and it allows users to spontaneously select and receive a program. What is also needed is a system that is highly transportable, independent, and does not require the use of a docking station to receive audio data.

What is also needed is an audio distribution system that is capable of intelligently providing information to users. Prior art distribution systems, such as radio broadcasts, provide information, such as weather, news and commercials, which is believed to be relevant to the majority of its listeners. However, this information is often irrelevant to a large portion of listeners. Information can be much more effectively provided if it is selected based upon a users individual characteristics and transmitted to that individual user.

SUMMARY OF INVENTION

1. Objects of the Invention

It is an object of the present invention to provide a system for distributing audio information.

It is a further object of the present invention to provide a system that allows the user to contemporaneously select, receive, and play a selected audio program.

It is a further object of the present invention to provide a system for a portable receiver that may receive programs over a communication network and play the programs as they are received.

It is a further object of the present invention to provide a system that is capable of distributing live programs.

It is a further object of the present invention to provide a receiver with a user interface that is convenient to the user.

It is a further object of the present invention to provide a receiver that allows a user to pause a program and resume listening to the program at the point the program was paused.

It is a further object of the present invention to provide a receiver that allows a user to fast forward and fast reverse a program.

It is another object of the present invention to provide a system that is capable of using satellites to transmit audio data to a receiver.

It is another object of the present invention to provide an audio system that is capable of transmitting a plurality of streams of data to a receiver for storage or output.

It is yet another object of the present invention to provide a system that is capable of intelligently selecting, playing, and arranging audio programs for individual listeners.

These and other objects and advantages will be realized from the following specification and claims.

2. Brief Description of the Invention

The present invention comprises a system that allows the user to select, receive and listen to audio programs that are stored or made available at a location remote to the user. A receiver is provided that allows the user to start a program at a selected position in the program, move forward and backward within a program (as with a tape player), and pause and resume a program. The receiver comprises a network interface, user controls, an audio decompresser, an audio output driver, a central processing unit (CPU), and a power supply. The receiver may also comprise a radio broadcast receiver and a media player.

The system of the present invention comprises at least one server connected to a communication network. The server stores programs and network addresses of programs that are available to the user. Under normal operation, the server would transmit an audio program to the receiver in an optionally compressed stream of data over the communication network. The receiver would receive the stream of data, decompress the data, and generate output for the user. The server may also store a list of network addresses for servers or sources that store particular programs. When the user selects a program, the server transmits a network address to the receiver that then automatically begins communication with a source to receive data for the chosen program.

The communication network of the present invention may comprise a variety of communication means, such as radio frequency transmitters and receivers, communication wires and cables, and communication satellites. Any of a variety of well known network protocols may be used.

REFERENCE NUMERALS

Figure 1:
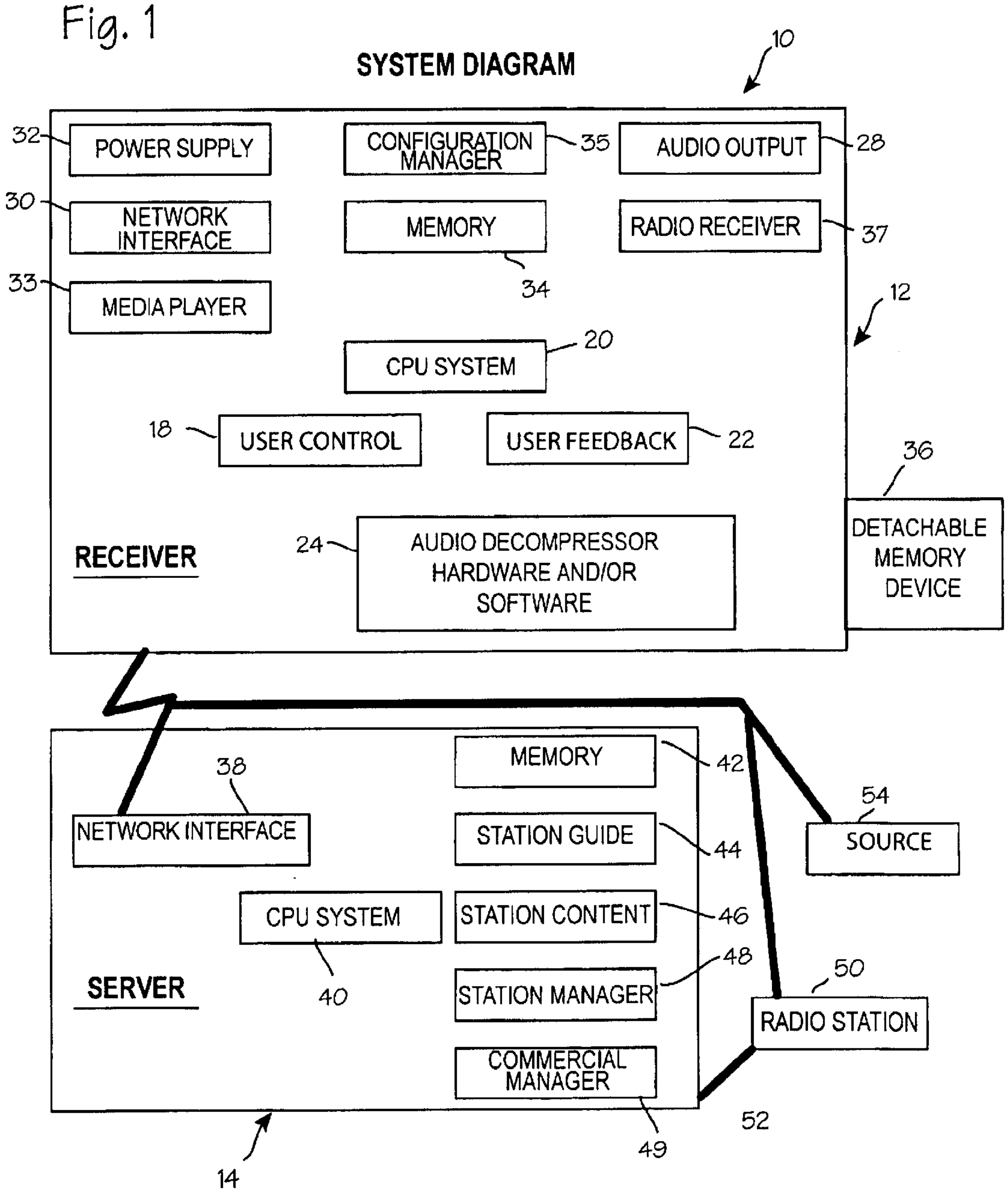
FIG. 1 is a schematic diagram of the system of the present invention.

10 system
12 receiver
14 server
16 network
18 user controls
20 CPU
22 user feedback
24 audio decompressor
28 output device
30 network interface
32 power supply
33 media player
34 memory device
34 configuration manager
36 detachable memory device
37 radio receiver
38 network interface
40 CPU
42 memory device
44 station guide
46 station content
48 station manager
49 commercial manager
50 radio station
52 communication means
54 source
80 method block
82 method block
84 method block
86 method block
88 method block
88 method block
90 method block
92 method block
94 method block
96 method block
98 method block
100 method block
102 method block
104 method block
106 method block
108 method block
110 method block
140 display
142 LED
144 button
146 button
148 button
150 button
152 button
154 button
156 button
158 button
160 button
162 button
164 knob
166 button
202 method block
204 data base
210 method block

DESCRIPTION OF THE PREFERRED EMBODIMENT

As seen in FIG. 1, the present-invention comprises a system generally indicated as reference number 10. The system comprises a receiver 12, a server 14, and a communication network 16.

Receiver

Receiver 12 may be portable so that it can be transported like a radio or tape player. Alternatively, receiver 12 may be permanently mounted in a vehicle or at a fixed location. Receiver 12 may comprise the following major components: user controls 18, a central processing unit (CPU) 20, an audio decompressor 24, an audio output device 28, a network interface 30, a power supply 32, a media player, 33, a memory device 34, a configuration manager 35, a detachable memory device 36, and a radio receiver 37.

User controls 18 allow a user to operate receiver 12. The user may perform such functions as selecting a desired program, setting volume and tone, pausing and resuming a program, fast forwarding and fast reversing through a program, and storing configuration information, such as preferred or frequently listened to programs. User controls 18 comprise a front panel with buttons and knobs and an alphanumeric display. Alternatively, user controls 18 may comprise more sophisticated control devices, such as voice recognition so that the user can enter commands verbally and speech synthesis for providing feedback information to the user.

Audio decompressor 24 is responsible for decompressing digital audio data by any of a number of methods that are well known in the art. Typically, audio programs stored remotely will be compressed for efficient storage and transmission. Audio decompressor 24 will accept a compressed input data stream and will produce an uncompressed output data stream. Audio compressor 24 may be implemented in dedicated hardware, or it may be a software algorithm running on CPU 20. It is recognized that program data may not be compressed in which case audio decompressor 24 would not be needed.

CPU 20 may be a standard microprocessor, such as an INTEL PENTIUM processor, or a custom design microprocessor with a memory device and input/output channels to communicate with the other components of receiver 12. CPU 20 is responsible for receiving and implementing commands from user controls 18 such as selecting a program or adjusting volume, establishing a data connection to and communicating with server 14, controlling the data flow from server 14 through network 16 to network interface 30 and to audio decompresser 24, controlling the audio decompression process, controlling audio output 28, and other functions necessary for controlling receiver 12. For example, CPU 20 may have hardware and/or software inserted commercials into a program. This may require CPU 20 to store commercial data, pausing a program at a desired location, and playing the commercial data.

The operating system of receiver 12 may be highly automated to require minimum input by the user so that the device is easy to use. For example, when receiver 12 is turned on, it may automatically determine the kind of network in use and may automatically begin communication with a network server or source without prompting the user.

Audio output 28 receives decompressed digital data from audio decompresser 24, converts the digital data to analog form, and then drives speakers or an output port. Audio output 28 also accepts commands from CPU 20 to set volume and tone.

Network interface 30 connects to communication network 16 and facilitates communications. The type of network interface 30 depends on the type of communication network used. For example, if network 16 is the Internet, network interface 30 may be a digital modem and cellular transceiver for connecting to the Internet over cellular communication lines. The cellular transceiver allows receiver 12 to be mobile while communicating over the Internet. Other wireless technologies that are well known in the art may also be used. Alternatively, if receiver 12 is kept in one location, a phone line and a standard personal computer modem could be used to connect receiver 12 to the Internet. A satellite communication transmitter and receiver could also be used to connect receiver 12 to network 16. Communication over network 16 may be performed in a way that is well known in the art using well known protocols, such as TCP/IP, CDPD, SLIP, TELNET, CSLIP, and PPP.

Power supply 32 conditions and supplies power to receiver 12. Power supply 32 may include batteries or a means to convert external power to internal power. For example, household electricity or a car battery may be converted to the internal power required by receiver 12.

Media player 33 may be provided for retrieving audio data stored on storage media. Media player 33 may be capable of using magnetic tapes, optical disks, or other storage devices. Media player may be integrated into receiver 12 to avoid redundant components and it may be detachable.

Memory device 34 is used to store data that is used by receiver 12. This may include system configuration data, user preference, and operating system data. Although the present invention is not intended to permanently store program data, memory 34 may be used to temporarily store programs that are received by receiver 12. In this way, memory 34 may act as a buffer to store packets of data that are received to prevent interruptions of audio output that may occur when network 16 is slow or communication is momentarily interrupted.

Receiver 12 may also be capable of receiving a plurality of streams of data. In this event, memory device 34 may store one or more streams of data while another stream of data is used by receiver 12. Memory 34 may be any of a number of memory devices that are well known in the art, such as semiconductor based random access memory, flash memory, or a hard disk drive.

Configuration manager 35 may be a specialized hardware and/or software component for configuring receiver 12. This component may be capable of sensing the operating environment and adjusting the operation of receiver 12 accordingly. Configuration manager 35 may also be capable of identifying the user and applying stored user preferences to receiver 12.

A user may be required to pay for access to some servers, programs, or stations. Payment may be accomplished in a number of different ways. A detachable memory device 36, such as a PCMCIA card, flash read only memory, disk drive, smart card, debit card, credit card, telephone card, or compact disk drive, may be used to store encrypted identification numbers that a network device would use to grant access to a particular receiver. Detachable memory device 36 may be purchased individually by a user. Detachable memory device 36 may be programmed to allow access for a predetermined amount of time or access may be granted on a subscription basis where the user makes regular payments. Detachable memory device 36 may also store other information that is relevant to the user, such as user preferences.

It may be necessary from time to time to update the software and data on receiver 12. Software updates may be necessary to update the operating system, update network addresses for servers and sources on network 16, and update communication software. Updates may be transferred automatically from server 14 through network 16. Alternatively, detachable memory 36 may be used to transfer data and software.

Radio receiver 37 may be provided for receiving standard radio frequency broadcasts. Radio receiver 37 may be integrated into receiver 12 to reduce redundant components. Radio receiver 37 may also be detachable from receiver 12.

Network

Network 16 allows receiver 12 and server 14 to communicate with each other. Many different kinds of communication networks that are well known in the art may be used to facilitate communication, such as wide area networks and local area networks. The communication means of the network may be any of the communication means that are well known in the art. The communication means may include the Internet, telephone lines, satellites, fiber optic cables, and radio frequency transmitters and receivers. Network 16 may include any number of servers and devices that may be accessed by receiver 12.

Server

Server 14 operates much like a standard server on a communication network. It stores data and programs and allows remote devices to access the data. Various computers and storage devices that are well known in the art may be used as the server in the present invention. Server 14 comprises a network interface 38, a central processing unit (CPU) 40, and a memory device 42. Network interface 38 is similar to network interface 30 of receiver 12 in that it facilitates communication over network 16.

CPU 40 controls server 14 and communicates with other devices over network 16. CPU 40 may be any number of designs and configurations that are well known in the art.

Memory 42 stores program information and may store actual program data. Memory 42 may be a hard disk drive, tapes and a tape drive, compact disks and a compact disk drive, or a combination of these devices. The data on memory 42 may be grouped according to the type of data.

Station guide 44 is a catalog or list of programs and program information. The data in station guide 44 may include the name of programs, the dates of creation of each program, the network address of each program, an alternative address of each program, the length of each program, and other information.

The network address of each program indicates where on network 16 the program can be retrieved. A particular program may be stored on server 14 or on another server or source connected to network 16.

When receiver 12 connects to server 14, server 14 may, if requested, transmit data from station guide 44 to receiver 12. Different users may have access to different portions of station guide 44 depending upon their level of service provided to the user. After receiver 12 has received station guide data, it will present a list of programs currently available to the user. The user may then select a program to play. Using the address of the program, receiver 12 requests transmission of the program data from the appropriate server or source. If receiver 12 already has the network address of a particular station or source selected by the user, receiver 12 may communicate directly with the station or source and receiver 12 need not contact server 14.

Station content 46 is actual program data that may be provided by server 14. If a user selects a program on server 14, server 14 will transmit the program data to receiver 12. Server 14 may also receive programs from an external source for storage in memory 42 and for contemporaneous transmission. For example, server 14 may receive a radio program from a radio station 50 over a communication means 52. As the radio station's transmission is received, server 14 can simultaneously store the data in memory 42 and can transmit the data to receiver 12. In the preferred embodiment, server 14 compresses program data as it is received so that it can be more efficiently stored and transmitted over network 16. Communication means 52 may be radio frequency transmissions, a phone line, or satellite communication. Server 14 may also receive data from a network source 54 over network 16. Source 54 may be any content provider or another server. If receiver 12 has the network address of radio station 50 and source 54, which are connected to network 16, receiver 12 can communicate directly with these content providers and receive program data directly.

Memory 42 also includes station manager 48 which is a database and software for administering programs and station data and for allowing content providers to add their station and programs to the listings stored in station content 46. Station manager 48 can be made available to all who have access to it through the Internet or other network. Software is provided for adding, changing, or deleting listings that are stored in memory 42 and/or station guide 44. The listings can be added by anyone with access but changes and additions may be required to be approved by an administrator of server 14. The listing may include, but are not limited to, such data as station names, category and group of each station, and the network address of each station. By including data on the category of stations and programs, users can retrieve programs by the type of content provided. For example, if a user wanted to listen to a sports program, the user can view a list of sports programs and select a specific program or station in a category. Other possible categories include news, every category and subcategory of music, comedy, specific performers, language, gospel, live events (e.g. concerts and performances), financial, weather, traffic and information relevant to a geographic and location.

Memory 42 may also include commercial manager 49. The present invention makes it possible for users in many regions to hear radio broadcasts and stations from outside of their current geographical area. In some cases, the commercials that are broadcasted will not be appropriate for the area. Commercial manager 49 allows server 14 to play commercials and information that are more appropriate for the area of the listener. For example, station manager 49 may include data for commercials that correspond to different locations. When a receiver communicates with server 14, server 14 can identify the receiver's geographic location based on its network address or its identification number that is assigned to the receiver when the receiver is initially registered. Commercial manager 49 would then play commercials for the user's region. Other options include removing commercials completely from a program or playing commercials and information that address the user's interest or demographic profile.

Server 14 is preferably capable of transmitting multiple streams of data to a single receiver 12. This allows receiver 12 to receive sets of data that may be used separately. For example, receiver 12 may receive commercial data while it is receiving and playing a program for a user. The commercial data may then be played at an appropriate time.

Advantages

There are a number of features and capabilities of system 10 that are currently not available in the prior art. To fully appreciate and understand the novelty of system 10, it is best to consider the device as compared to known products, such as a radio, a tape recorder/player, and a personal computer. System 10 is able to combine features from each of the above devices. Receiver 12 is similar to a radio in that it provides audio output from a remote source. However, the user may select a particular program as well as a broadcast station. As an example, when a radio is tuned to a particular station, the user must listen to whatever program is currently being broadcasted on that station. In contrast, the present invention allows a user to select a particular program to be played at any given time. The program need only be provided by server 14 or another server or network source connected to the network 16. In addition to selecting a particular program, a user also has the option of selecting a broadcast station to listen to a contemporaneous broadcast. However, the broadcast station may be located anywhere in the world as long as it is connected to network 16.

When a program is selected, the user can take advantage of a number of features. The user can move quickly forward and backward through the program to skip portions of the program which do not interest the user. The user can also pause the program and can switch to another program and then return to the first program, beginning where the user paused. These features are reminiscent of a tape player. A tape player can also move quickly forward and backward, can pause a program, and can switch programs. However, the present invention precludes the need for the user to have physical possession of the program storage media. Instead, receiver 12 accesses programs provided at anyone of numerous remote locations connected to network 16.

A key feature of the present invention is the ability to access any program at any location accessible by the network to which the device is connected. If the network happens to be the Internet, then the device can play a program from nearly anywhere in the world. This is superior to a radio that typically has a very limited range of reception.

User controls 18 and the operating system of receiver 12 are simple like that of a radio or tape player to allow a user to easily operate the receiver. A user may operate the device while performing other tasks, such as driving a car, with a minimum of attention given to receiver 12. This is an advantage over a personal computer that requires a much greater degree of attention and operational skill and knowledge. Since the present invention is designed for performing a specific task, receiver 12 and user controls 18 are also much smaller and cheaper to manufacture than a personal computer.

Receiver Configuration

Receiver 12 may be configured using three methods; using a configuration manager 35 of receiver 12, using a master station, or configuration by a manufacturer or seller. The configuration of receiver 12 determines the operating parameters, such as the communication protocols to use, and presets for receiver 12.

Configuration manager 35 provides a mechanism for a user to configure the receiver. For example, programs can be assigned to a button, types of programs can be selected, or a group of programs can be scanned.

Receiver 12 has a physical interface, such as a button, which will place receiver 12 in its configuration mode. The user may scroll through various menus to select a program or station and assign it to a button. The physical interface may resemble the interface of a radio. A user will find the station that he/she is interested in (by scanning through categories or lists of stations) and select the preset button to assign to that station.

Configuration manager 35 also includes means for configuring receiver 12 to its operating environment. Preferably, configuration manager 35 can automatically sense the type of network connection being used and select the appropriate communication protocol and network addresses to be used with that network.

A user may also configure receiver 12 using an independent computer that has access to network 16. The user may use a graphical user interface on the computer to perform the configuration. Once the configuration is selected, the configuration can be transferred to receiver 12 using a computer interface, such as a parallel port or detachable memory device 36.

Receiver 12 can be preconfigured by a manufacturer or supplier. The configuration may also be changed by the supplier or operating company remotely through network 16 or by supplying the user with detachable memory device 36.

The receiver can be configured for "pay per listen." For example, detachable memory device 36 may be required to be inserted into the device to allow a provider to charge a user for a program. The configuration may also include an expiration time or date, similar to pay phone cards.

In order to access a "station" the receiver must be connected to network 16. Because different networks may be used, the user may indicate a particular network or configuration manager 35 may automatically sense the type of network. Once the type of network is selected, the system can be configured by the user or the system to determine how and when to connect to the network. For example, if the connection is via cellular modem, the system may connect as soon as the receiver is turned on. If the connection is via a cable system, the connection may be active at all times.

Method of Operation

Figure 2:
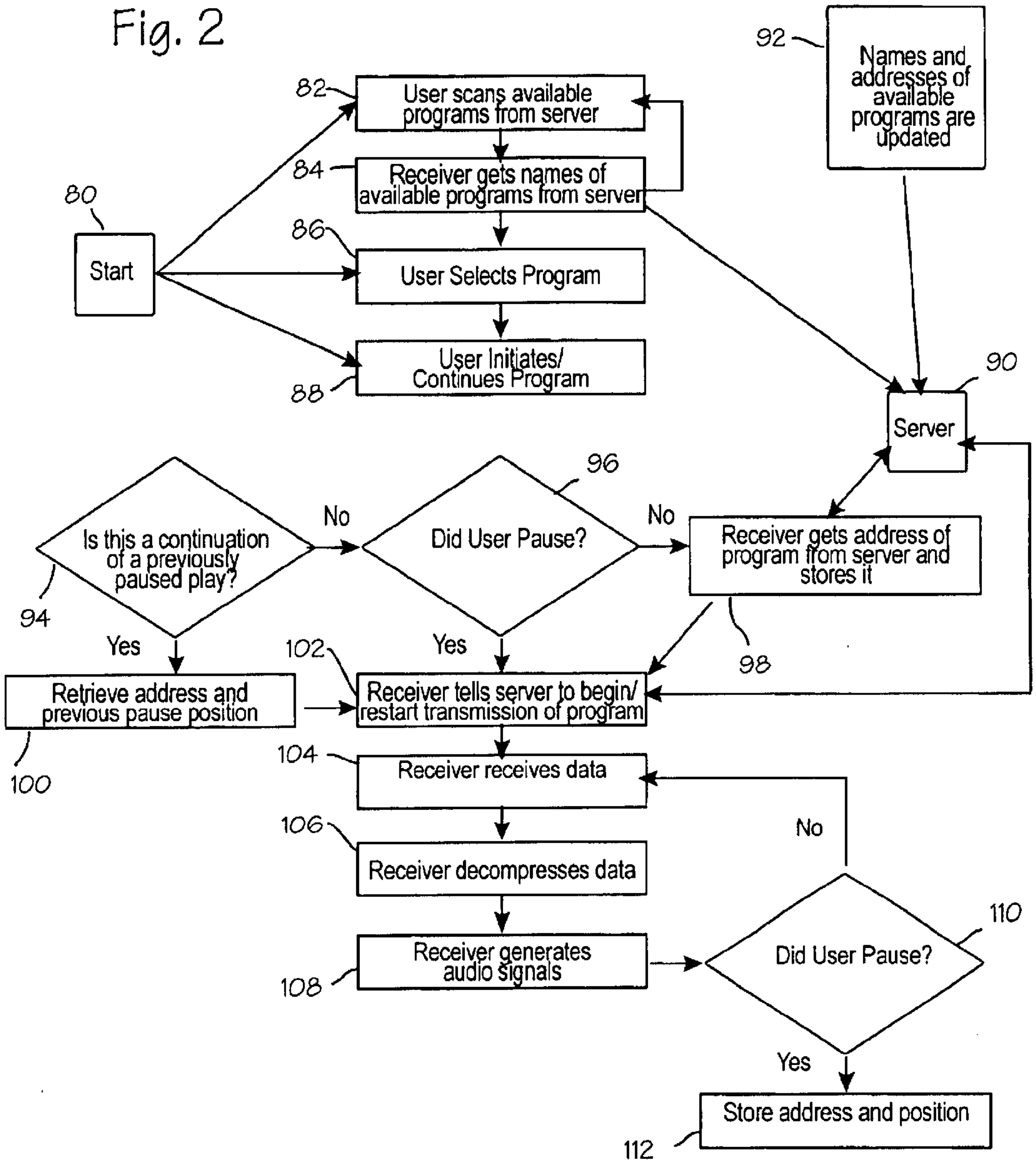
FIG. 2 is a flow chart of a method by which a program is selected and played.

FIG. 2 represents a flow chart of a method of operation for the present invention. A user session may begin at three different locations as indicated by start block 80. A user may scan a list of programs that are currently available to the user 82. Receiver 12 could automatically connect to server 90 and request a list of programs that are currently available to the particular user 84. Server 90 would transmit a list of programs back to receiver 12 that would present the list to the user on a display.

At this point, a user would select a program 86 and would initiate play by pushing a play button or by some other user interface means 88. In some cases, a program may have been paused by this particular user at a previous time. For example, a user may have been driving in his car and when he reached his destination, he paused the program he was listening to and exited the car. When the user returns he may wish to continue to listen to the program where he had left off. In this event, the user may touch a dedicated button that would request that the server begin transmission at the point he paused the program 88. The receiver, detecting a pause signal 94, would then retrieve the address in the previous pause position 100 and request the server to begin transmission of the program at the pause position 102. If the user does not wish to begin the program at the pause position, the receiver then determines if the address of the selected program is known to the receiver 96. If the address is not known, the receiver obtains the address from server 90 and stores it 98. At this point the receiver would request that the server begin transmission of the selected program 102. The server would begin transmission and the receiver would receive the data 104. The receiver then decompresses the data 106 and generates an audio signal 108.

The receiver continuously looks for input commands by the user, such as a pause command 110. If no pause command is detected, the receiver continues to receive the data from server 90. If the receiver detects a pause signal, the receiver would store the address of the program and the position the user activated the pause function.

Figure 3:
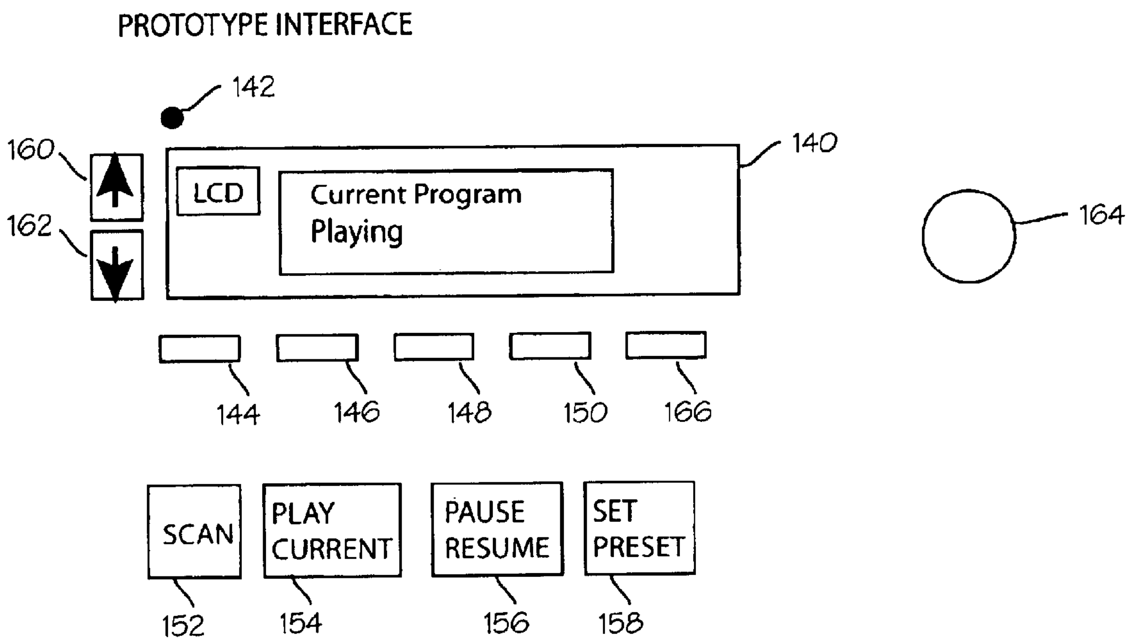
FIG. 3 is a schematic diagram of the user interface of the present invention.

FIG. 3 represents a user interface that may be used to implement the present invention. A display 140 may be used to display information in alphanumeric form. Information displayed may include a selected program, a list of programs, current status of receiver 12, the current time, and many other kinds of information. An LED 142 may be used to indicate if receiver 12 is currently on. Buttons 144, 146, 148, and 150 may be used to store user presets so that a user could go directly to a program or station that the user often listens to. A button 152 may be provided which is used to scan programs on a particular category or list of programs. A button 154 may be provided for playing the currently indicated program. A button 156 may be used to pause and resume a particular program. A button 158 may be used to set a user preset. Buttons 160 and 162 may be used to scroll through a list of programs, stations, or commands presented on display 140. A knob 164 may be used to control the volume of the audio output of receiver 12. Button 166 may be used to configure receiver 12. For example, phone numbers may be added to connect to a communication network.

Information Selection Method

Figure 4:
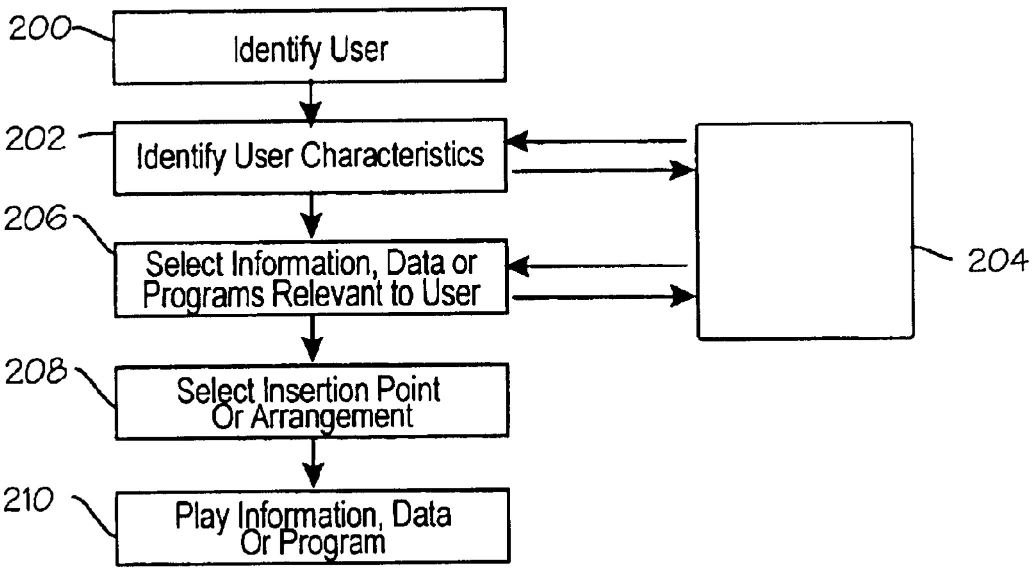
FIG. 4 is a flow chart of method of selecting and arranging information relevant to a user.

System 10 of the present invention may utilize an information selection method like that described in FIG. 4 for determining information to be presented to a user. This method can be used to determine the information, data, or programs that are presented to a user. For example, system 10 may determine commercials that are relevant to a user and play them at selected points in a program.

The method would begin by identifying a user 200. This may be performed by receiver 12 by a number of different methods. For example, receiver 12 may require an access code to be entered by the user that identifies the user or receiver 12 may detect the user from information on detachable memory device 36. Alternatively, the user may be assumed to be the person who is registered as the owner of receiver 12. The user's characteristics would then be identified 202. This may be performed by referencing user characteristics stored in data base 204. Data base 204 may comprise information and configuration manager 35, detachable memory device 36, memory 34, or memory 42 of server 14. User characteristics may include a large variety of information, such as age, sex, preferences, profession, income, residence, language, and interests.

Once the user's characteristics have been determined, information that is relevant to the user is selected. The information that is relevant to the user may be stored on data base 204 which may comprise memory 34, detachable memory device 36, or memory 42 of server 14. The information may include commercials, programs, news, weather, and system generated messages. If the selected information is stored in memory 42 of server 14, the information is transmitted to receiver 12 for storage or play.

Once relevant information is selected, the insertion point of the information or the arrangement of programs is determined. For example, if a commercial has been selected, it may be determined that the commercial will be played when a program that is currently playing is completed. If the user is receiving a live broadcast, such as a sporting event, system 10 may wait until there is a break in the activity to play a commercial. Alternatively, system 10 may play a selected commercial in place of a commercial that is transmitted in the same date stream as the program.

Once the insertion point or arrangement has been determined, system 10 would play the information or program for the user 210. In this way, system 10 allows for the intelligent selection and arrangement of programs and information for the user.

Summary

It may now be realized that the present invention provides a novel apparatus for making audio information available to users. The system of the present invention comprises a receiver, a server, and a communication network. The receiver is capable of interactively communicating with a user and the server. The network facilitates communication between the receiver and other devices attached to the network. The system allows the user to select, receive, and listen to a program in a contemporaneous manner. The present invention also comprises means for intelligently arranging and playing audio information.

Although the description above contains many specifications, these should not be construed as limiting the scope of the invention but as merely providing illustrations of some of presently preferred embodiments of this invention. Thus, the scope of the invention should be determined by the appended claims and their legal equivalents rather than by the examples given.

What is claimed is:

1. A system for distributing audio programs and information over the internet, said internet comprising a plurality of content servers with unique addresses, said content servers capable of serving audio data directly or indirectly to receiving client computers or appliances, said internet also comprising a plurality of receiving client computers or appliances adapted for connection to the internet, said system comprising:

at least one additional server, said additional server having storage means for storing address information for the plurality of content servers, said additional server programmed to permit receiving client computers or appliances to select a content server, said additional server being programmed to negotiate transmission of audio data from the plurality of content servers to receiving client computers requesting such transmission;

wherein the receiving client computer or appliance is programmed with software for communicating with the additional server and selecting a content server address from amongst the addresses stored in the additional server and thereafter receiving audio data from the selected content server;

wherein the additional server additionally comprises means for identifying geographic data pertaining to the receiving client computer;

means for storing geographically correlated audio content, where the geographically correlated audio content is correlated to the geographic data; and means for transmitting the geographically correlated audio data to the receiving client computer in place of a portion of the audio content transmitted by the selected content server.

2. A system for distributing audio programs and information over the internet, said internet comprising a plurality of content servers with unique addresses, said content servers capable of serving audio data directly or indirectly to receiving client computers or appliances, said internet also comprising a plurality of receiving client computers or appliances adapted for connection to the internet, said system comprising:

at least one additional server, said additional server having storage means for storing address information for the plurality of content servers, said additional server programmed to permit receiving client computers or appliances to select a content server, said additional server being programmed to negotiate transmission of audio data from the plurality of content servers to receiving client computers requesting such transmission;

wherein the receiving client computer or appliance is programmed with software for communicating with the additional server and selecting a content server address from amongst the addresses stored in the additional server and thereafter receiving audio data from the selected content server;

wherein the additional server additionally comprises means for identifying geographic data pertaining to the receiving client computer;

means for storing geographically correlated audio content, where the geographically correlated audio content is correlated to the geographic data;

means for transmitting the geographically correlated audio data to the receiving client computer simultaneously with transmission of the audio data; and the receiving client computer is additionally programmed to simultaneously receive and play the audio content from the selected content server and receive and store the geographically correlated audio data for playback after reception.

3. A system for distributing audio programs and information over the internet, said internet comprising a plurality of content servers with unique addresses, said content servers capable of serving a stream of audio data directly or indirectly to receiving client computers or appliances, said internet also comprising a plurality of receiving client computers or appliances adapted for connection to the internet, said system comprising:

at least one additional server, said additional server having storage means storing address information for the plurality of content servers, said additional server programed to permit receiving client computers or appliances to select a content server, said additional server being programmed to negotiate transmission of audio data from the plurality of content servers to receiving client computers requesting such transmission;

wherein the receiving client computer or appliance is programmed with software for communicating with the additional server and selecting a content server address from amongst the addresses stored in the additional server and thereafter receiving a stream of audio data from the selected content server;

wherein the additional server additionally comprises means for identifying geographic data pertaining to the receiving client computer;

means for storing geographically correlated audio content, where the geographically correlated audio content is correlated to the geographic data; and means for transmitting the geographically correlated audio data to the receiving client computer in place of a portion of the stream of audio content transmitted by the selected content server.

4. A system for distributing audio programs and information over the internet, said internet comprising a plurality of content servers with unique addresses, said content servers capable of serving a stream of audio data directly or indirectly to receiving client computers or appliances, said internet also comprising a plurality of receiving client computers or appliances adapted for connection to the internet, said system comprising:

at least one additional server, said additional server having storage means storing address information for the plurality of content servers, said additional server programmed to permit receiving client computers or appliances to select a content server, said additional server being programed to negotiate transmission of audio data from the plurality of content servers to receiving client computers requesting such transmission;

wherein the receiving client computer or appliance is programmed with software for communicating with the additional server and selecting a content server address from amongst the addresses stored in the additional server and thereafter receiving a stream of audio data from the selected content server;

wherein the additional server additionally comprises means for identifying geographic data pertaining to the receiving client computer;

means for storing geographically correlated audio content, where the geographically correlated audio content is correlated to the geographic data;

means for transmitting the geographically correlated audio data to the receiving client computer simultaneously with transmission of the a stream of audio data; and the receiving client computer is additionally programmed to simultaneously receive and play the stream of audio content from the selected content server and receive and store the geographically correlated audio data for playback after reception.

* * * * *